United States Patent [19]
Harrila

[11] Patent Number: 5,572,577
[45] Date of Patent: Nov. 5, 1996

[54] INFORMATION SYSTEM FOR A PABX

[75] Inventor: Raija Harrila, Espoo, Finland

[73] Assignee: ICL Data OY, Helsinki, Finland

[21] Appl. No.: 335,931

[22] Filed: Nov. 8, 1994

[30] Foreign Application Priority Data

Nov. 9, 1993 [FI] Finland ................... 934952

[51] Int. Cl.⁶ ................................. H04M 1/64
[52] U.S. Cl. ................ 379/67; 379/88; 379/89; 379/207; 379/210; 379/212; 379/214
[58] Field of Search .................... 379/210, 211, 379/212, 213, 214, 196, 198, 67, 88, 89, 207

[56] References Cited

U.S. PATENT DOCUMENTS

| | | | |
|---|---|---|---|
| 3,793,487 | 2/1974 | Kilby | 379/74 |
| 4,529,841 | 7/1985 | Andersson et al. | 379/213 |
| 4,661,975 | 4/1987 | Brecher | 379/215 |
| 4,811,381 | 3/1989 | Woo et al. | 379/213 |
| 4,941,167 | 7/1990 | Cannelte et al. | 379/67 |
| 4,969,182 | 11/1990 | Ohtsubo et al. | 379/214 |
| 5,119,415 | 6/1992 | Aoyama | 379/213 |
| 5,313,517 | 5/1994 | Inaguma | 379/67 |
| 5,327,486 | 7/1994 | Wolfe et al. | 379/142 |
| 5,329,578 | 7/1994 | Brennan et al. | 379/211 |
| 5,434,906 | 7/1995 | Robinson et al. | 379/212 |
| 5,434,908 | 7/1995 | Klein | 379/67 |

FOREIGN PATENT DOCUMENTS

| | | | |
|---|---|---|---|
| 0346568A3 | 12/1989 | European Pat. Off. | H04Q 3/54 |
| 0455912A2 | 11/1991 | European Pat. Off. | H04M 3/50 |
| 0621715A1 | 10/1994 | European Pat. Off. | H04M 3/50 |
| 0239756 | 10/1987 | Japan | 379/201 |
| WO93/00763 | 1/1993 | WIPO | H04M 3/02 |

Primary Examiner—Krista M. Zele
Assistant Examiner—Parag Dharia
Attorney, Agent, or Firm—Fitch, Even, Tabin & Flannery

[57] ABSTRACT

The invention relates to an information system for a PABX (1) having extensions (B1–B5), a switchboard (2) for manual switching operations, and a direct inward dialling (DDI) function for switching calls provided with a DDI code directly to the PABX extensions. In the invention, the majority of incoming calls to the PABX are controlled by the information system of the invention, which comprises a database (21) maintaining status information on PABX subscribers, and a central processing unit CPU (20) connected to the database and to a voice message unit (22) controlled by the CPU on the basis of status information retrieved from the database, to deliver the desired voice messages to the calling party. When there is no reply from an extension or an absence code has been programmed, the CPU (20) reads from the database the reason for the absence and directs the voice message unit (22) automatically to output a voice message indicating the reason for the absence and, if desired, offering alternative functions, such as leaving a call back message, switching to another PABX extension, etc.

9 Claims, 1 Drawing Sheet

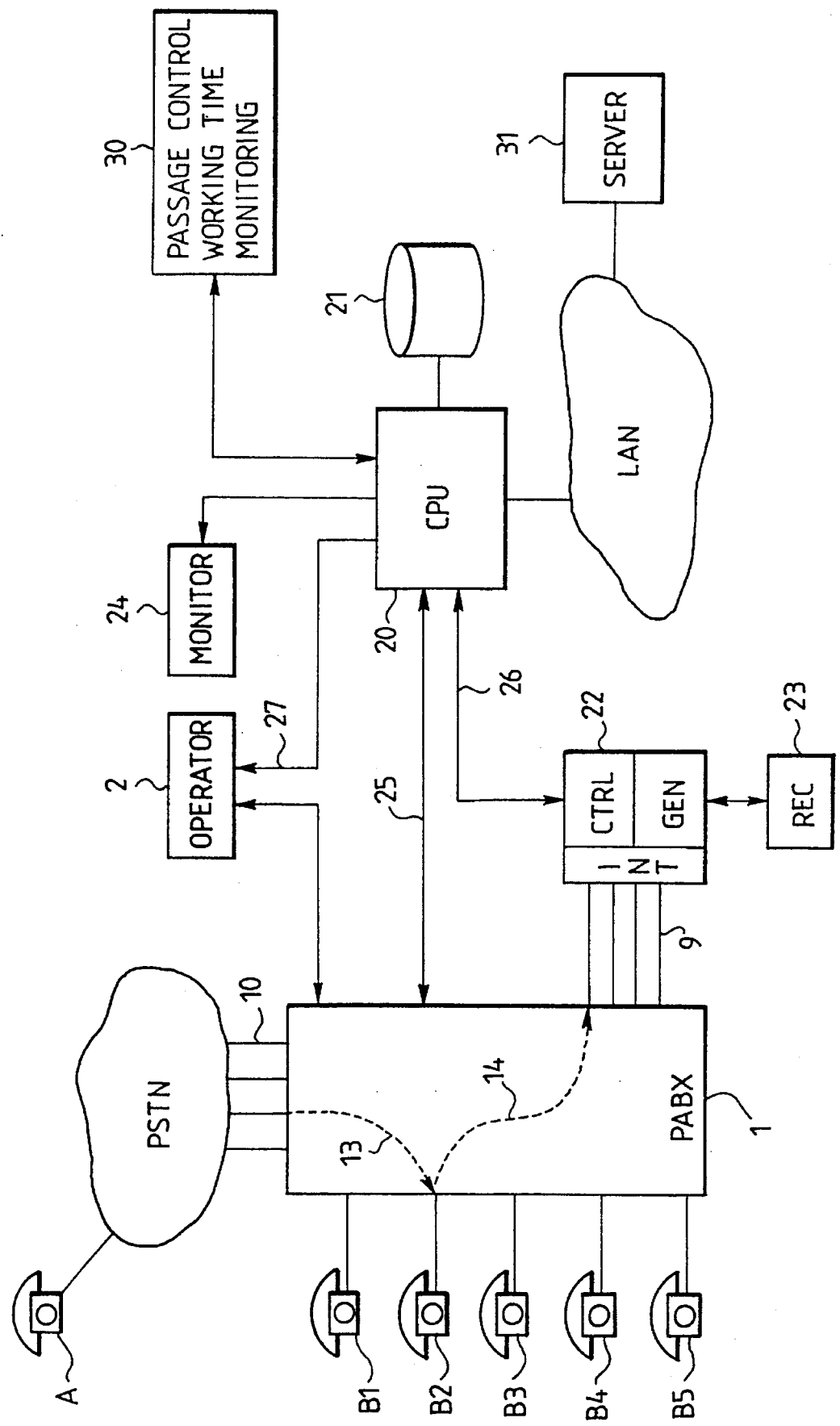

INFORMATION SYSTEM FOR A PABX

FIELD OF THE INVENTION

The present invention relates to an information system for a private automatic branch exchange (PABX).

BACKGROUND OF THE INVENTION

A PABX is an exchange in the private use of a subscriber. The PABX has access to a public switched telephone network through direct trunk lines and direct inward dialling (DDI) lines from an exchange. An intra-PABX call can be established without engaging a trunk line. The direct trunk lines of the PABX are primary trunks of an exchange in the public switched telephone network PSTN, called trunk groups, and access points of the PABX are extensions of the PABX. The PABX also incorporates a switchboard (console) for a telephone operator (attendant) whose task is to handle the incoming calls and serve the extensions. The most important function of the PABX operator is switching: answering the call, connecting, i.e. selecting the desired extension number, and leaving the line. Normally at least part of the incoming call traffic to the PABX is direct inward dialling (DDI) traffic, i.e. each extension has an external telephone number and hence a PSTN subscriber has direct access to an extension without assistance of the operator. This is accomplished in such a manner that a specific DDI code is included in the dialled telephone number. The initial purpose of the DDI function was to reduce the number of exchange calls arriving at an operator's console and thereby to diminish the load on (possibly also the number of) operators. Today, however, operators answer exchange calls only for about 20% of their working time. About 40% of their working time is occupied by picking up DDI calls that are returned to the PABX on the basis of an absence code programmed into the telephone or on the basis of information obtained from a working time monitoring system. The remainder, 40%, of their time the operators pick up calls returned from extensions on account of no reply. Furthermore, the operators receive and deliver a large number of call back messages.

Presently operators of PABXs often have access to an information system from which they obtain the status of the called PABX subscriber (e.g. conference, vacation, sick leave) onto a display unit. The operator can then provide this information to the calling party. The problem with present-day information systems, however, is that the status information stored in them is generally based on information given by the individual himself. Thus updating the status information is dependent on the initiative and care of the individual.

Nowadays PABXs also incorporate voice mail services to which a subscriber for a PABX extension can transfer calls arriving during his absence. The voice mail normally contains a general voice message from the PABX subscriber, prompting the calling party to leave a message in the voice mail. A corresponding function is achieved when a conventional telephone answering machine is used. Also in voice mail, the PABX subscriber himself is responsible for the updating and content of the voice message provided to the calling party, and usually the message contains no information about the reason for or expected duration of the unavailability of the PABX subscriber. Thus the calling party cannot know when the called party will be available or when he will listen to the voice message left by the calling party in the voice mail. In this situation, the only way to check the matter is to make a call to the operator switchboard and enquire the operator. Thus the significance of voice mail in diminishing the work load of the PABX operator will be negligible.

The PABX operators, therefore, will have very little time for answering direct trunk calls which are significant for customer service and which are usually placed by new customers to the company who do not know of any contact person or DDI number of such a person in the company yet. In the worst case, long answering times for trunk calls can even cause the caller to hang up, in which case the new customer contact is completely lost. If the work load of the PABX operator could be diminished in other respects, there would be more time to answer the direct trunk calls and service would improve in this respect.

DISCLOSURE OF THE INVENTION

The object of the present invention is an information system for a PABX, enabling reducing of an operator's work load caused by DDI calls that are returned from extensions.

This object is achieved with an information system for a PABX having PABX extensions, an operator switchboard for manual switching operations, and a direct inward dialling function for switching calls provided with a direct inward dialling code directly to the PABX extensions without assistance of the operator, the information system comprising a database maintaining status information on subscribers for the PABX extensions, a monitor associated with the operator switchboard for displaying the status information stored in the database, a voice message unit for delivering and storing voice messages, the PABX being adapted to switch the call automatically to the voice message unit when there is no reply from the called PABX extension or when a function blocking calls to the PABX extension has been activated, a control unit connected to the PABX, to the database and to the voice message unit, said control unit being responsive to information obtained from the PABX and indicating the switching of a call initially directed to a given PABX extension to the voice message unit, for providing control commands for the voice message unit on the basis of the status information, stored in the database, of a subscriber for said given PABX extension, and the voice message unit being adapted to deliver voice messages relating to the status of the subscriber for said given PABX extension and to the further handling of the call automatically to a calling party, the voice messages being generated on the basis of control commands received from the control unit.

The basic idea of the invention is that the majority of incoming telephone traffic to a PABX is directed by means of an information system according to the invention, which comprises a database maintaining status information on subscribers for the PABX extensions, and a CPU connected to the database and to a voice message unit controlled by the CPU on the basis of status information retrieved from the database, to deliver the desired information to the calling party as voice messages. With this automatic voice message system, the number of DDI calls returned to the PABX operator's switchboard can be reduced and the waiting time for calls shortened. When there is no reply from a DDI number or a reason for absence has been coded for the extension, the CPU reads from the database the reason for the unavailability of the called party and commands the voice message unit automatically to indicate to the calling party such a reason as a voice message and, if desired, offer additional options, such as leaving a call back message, switching to another PABX extension, or handing over to the PABX. Thus answering direct trunk calls remains the task of the operator. The work load on the operator diminishes, and customer service will be effective.

The system of the invention preferably has access to other systems, such as a working time monitoring system, a passage control system, or other company applications, such as office systems and a personnel register. The information stored in the database of the information system of the invention can be automatically updated with the information retrieved from these systems. Up-to-date information considerably facilitates call control and diminishes the forwarding time of the call. When the system has up-to-date information on the availability of the personnel, alternative service can be immediately offered to the calling party when necessary.

BRIEF DESCRIPTION OF THE DRAWINGS

In the following the invention will be explained by means of an illustrating embodiment with reference to the accompanying drawing, wherein FIG. 1 is a block diagram of an information system according to the invention, connected to a PABX.

PREFERRED EMBODIMENTS OF THE INVENTION

FIG. 1 shows a PABX 1 which may be described as an exchange in the private use of a subscriber, having access through direct trunk lines and DDI trunk lines 10 to a PSTN. The PABX 1 further has a plurality of extensions B1, B2, B3, B4 and B5. Furthermore, the PABX has a switching point (operator switchboard) 2 that an operator (attendant) uses to perform various functions, such as switching, which includes answering a direct trunk call, connecting, i.e. selecting the desired PABX extension, and leaving the line. PABX 1 also includes an option for direct inward dialling (DDI), which means that a subscriber A in the PSTN may have direct access to a given PABX extension without operator assistance. Subscriber A may execute a DDI call by dialling a telephone number containing a DDI code and the number of the called PABX extension. The telephone number of the PABX may be for example 618821, which directs a trunk call to the operator switchboard 2. The DDI number to an extension in the same PABX may be 61882252, wherein the last four digits are, in the given order, a DDI code 2 and the number of the called extension 252. Dialling this external telephone number results in a DDI call at extension 252 without operator assistance.

It is to be noted that the present invention is fully independent of the type of PABX, that is, the information system of the invention can be applied to any modern PABX having a DDI function. Such exchanges include L. M. Ericsson MD110, Siemens HICOM and TOPCOM, Nokia ISDX, etc.

In accordance with the invention, said PABX has access to an information system according to the invention. The information system provides automatic voice message and call control functions. The basic elements of the information system according to the invention are a central processing unit CPU 20, a database 21 and a voice message unit 22. The database 21 maintains subscriber data for the PABX extensions, such as names of subscribers, presence information, possibly routing information and extension-specific messages, in addition to the basic information for the extensions in the PABX(s) accessing to the information system, such as name of company and division.

The operation of the information system is controlled by CPU 20, which is connected to PABX 1, to database 21 and to voice message unit 22. The CPU 20 preferably also has access to various other system applications 30 in the company, such as a passage control system, working time monitoring system, or other company applications, personnel registers, office systems, etc. The CPU 20 may further access to a local area network LAN and therethrough e.g. to the above systems, to corresponding information systems in other PABXs, and to various service applications in the company, such as electronic mail. The CPU 20 updates the information stored in the database 21, in particular the presence data of subscribers, from the passage control, working time monitoring, personnel register and office systems available for this purpose in each case. The available information can be added as new systems are introduced in the company. The most widely used systems include a passage control and working time monitoring system; furthermore, office systems that may be employed include a personal calendar of an individual, stored for instance in a server 31 interfacing with a LAN. Thus the information utilized in the database 21 may have any source, as long as the information is suitable as such for determining the availability status of the PABX subscriber. If such databases are not available in the company, or in addition to such databases, the subscriber data in the database 21 can be updated on the basis of information given by the individual by telephone, e.g. by means of dialled codes. Furthermore, the CPU 20 can display the availability status of PABX subscribers to the PABX operator on a monitor 24 at the operator switchboard 2, as in the conventional information systems.

The voice message unit 22 is connected to one or more extension lines 9 of the PABX 1, said lines being reserved specifically for this purpose. The unit 22 can be roughly divided into three operative blocks: control unit CTRL, speech generating unit GEN, and line interface unit INT. The line interface unit INT incorporates the necessary functions and circuits for interfacing to extension lines 9. The line interface unit INT also comprises push-button DTMF (Dual Tone Multi-Frequency) or pulse dialling detection circuitry, which is employed for detecting the dialled digits from the calling party, as will be explained hereinafter. The control unit CTRL controls the operation of the entire unit 22 in response to commands received from the CPU 20 via a control line 26. The speech generating unit GEN generates speech under the control of the control unit CTRL, and the speech is delivered to the caller via the line interface unit INT. The speech generating unit GEN may be a conventional speech synthesizer. Synthesized speech, however, is still considered by many as mechanical and unpleasant, and therefore may be preferable to use natural, recorded speech. In the primary embodiment of the invention, a voice recorder 23, such as a compact disc driver unit, is incorporated in the voice message unit 22. Recorded voice message portions, which may be sentences, individual words, names of persons, name of company etc., are stored in the voice recorder 23. Under the control of the control unit CTRL, the speech generating unit GEN retrieves the necessary voice message portions from the recorder 23 and combines them into a voice message to be delivered in each case. The PABX 1 is adapted to switch incoming DDI calls that are directed to a PABX extension wherefrom there is no reply or into which a function blocking calls to the PABX extension has been coded, to one of the PABX extensions 9 reserved for the voice message unit 22. For example, if a PSTN subscriber A dials a DDI number associated with an extension B2, the PABX 1 switches the call first to the extension B2, as is shown by a broken line 13, and if there is no reply from extension B2, the PABX 1 switches the call further to the voice message unit 22, as is shown by a broken line 14. The PABX 1 informs the CPU 20 via line 25 of the fact that a call has been switched to unit 22, and the number of the called extension, the extension 9 to which the call is now connected, and the status of the call (no reply from extension, blocking, etc.). On the basis of the number of the called extension, the CPU 20 reads from the database 21 the availability status of the subscriber at the called extension and other information that is desired to be provided to the calling party. On the basis of the information stored in the database 21, the CPU 20 provides control commands for controlling the voice message unit 22 via the control line 26. In response to the commands, the voice message unit 22 generates a voice message that is delivered to the PABX extension line 9 to which the call is switched. The format and content of the generated voice message may naturally vary depending on the type of information and services offered to the calling party. Let us assume by way of example that a call has arrived for person Z at company X. According to the information stored in the database 21, person Z is on vacation today and available tomorrow. In such a case, the CPU 20 may command the voice message unit to generate a reply of e.g. the following content: "Company X, good morning. Mr. Z is on vacation today, but he will be available again tomorrow."

Furthermore, additional alternative functions for proceeding with the call, such as leaving a call back message, switching to another PABX extension, to voice mail or back to the PABX 1 may be included in the voice messages offered to the calling party, if desired. A function code is associated with each alternative function, and thus the calling party (subscriber A in the PSTN) can select the desired function by dialling the relevant function code at the keypad of his telephone set. The alternative functions may be given to the calling party by means of e.g. the following voice message: "Your can select any of the following functions by dialling the relevant function code, 1 voice mail, 2 call request message, 3 operator". The function code dialled by the calling party is detected by dialling detection circuitry in the line interface unit INT of the voice message unit 22, and the information on the selected function is transmitted to the CPU 20 via control line 26. The CPU 20 redirects the call switched by the PABX 1 in the desired manner. The control can be accomplished in several ways. One way is to control the PABX 1 by the CPU 20 directly via control line 25. Another way is to couple the CPU 20 to an RS232 interface which is typically provided at operator switchboard 2 for control purposes. In such a case, the PABX 1 may be thought of as being under the control of the CPU 20, simulating a manual switching operation. A third way is to command the line interface unit INT of the unit 22 to perform a call transfer, which is normally carried out by the PABX, from the extension line 9 to the desired PABX extension.

In FIG. 1, the information system of the invention is shown as connected to one PABX. A single information system can, however, also be adapted to serve several PABXs simultaneously. The information system according to the invention also enables unmanned PABXs to be realized, so that there is no operator at the PABX. Furthermore, the invention enables control of a number of unmanned PABXs from one service centre having an information system according to the invention and operators common to the PABXs.

The figure and the description relating thereto are only intended to illustrate the present invention without limiting it in any way. The implementation of the information system according to the invention may vary within the spirit and scope of the accompanying claims.

I claim:

1. An information system for a PABX having PABX extensions, a control port, an operator switchboard for manual switching operations, and a direct inward dialling function for switching calls provided with a direct inward dialling code directly to the PABX extensions without assistance of the operator, the information system comprising a database external to the PABX for maintaining status information on subscribers for the PABX extensions, a monitor external to the PABX and associated with the operator switch-board for displaying the status information stored in the database, a voice message unit external to the PABX, connected to predetermined ones of the PABX extensions for delivering and storing voice messages, the PABX for receiving a call from a calling party to a called PABX extension and for automatically switching the calling party to one of said predetermined PABX extensions when there is no reply from the called PABX extension or when calls to the called PABX extension are blocked and, when an automatic switch occurs, for sending information to the control port identifying the called PABX extension and the one of the predetermined PABX extensions to which the automatic switch occurred, a control unit external to the PABX, connected to the control port of the PABX, to the database and to the voice message unit, said control unit being responsive to said information at the control port of the PABX for retrieving status information of a subscriber of said called PABX extension from said database and providing control commands for the voice message unit on the basis of said retrieved status information, stored in the database, of a subscriber for said given PABX extension, and the voice message unit being responsive to said control commands for generating voice messages to the calling party, said voice messages relating to the status of the subscriber of said called PABX extension and to the further handling of the call.

2. A system as claimed in claim 1, wherein the voice message unit comprises a voice message recorder in which recorded voice message portions, such as individual words; are stored, and a voice message generating unit obtaining the voice message portions from the voice message recorder in response to control commands obtained from the control unit and combining them into a voice message.

3. A system as claimed in claim 1, wherein the voice message unit comprises a speech synthesizer for synthesizing a desired voice message in response to control commands obtained from the control unit.

4. A system as claimed in claim 1, wherein the voice message delivered comprises alternative functions between which the calling party may choose for further handling of the call, and wherein the voice message unit comprises means for receiving function codes dialled by the calling party in pulse or DTMF form and for initiating a selected function for further handling of the call according to the received code.

5. A system as claimed in claim 4, wherein the alternative functions include voice mail.

6. A system as claimed in claim 1, wherein the system comprises means for automatic updating of the status information stored in the database by means of other database systems that maintain subscriber data.

7. A system as claimed in claim 1, wherein the status information stored in the database can be updated by the PABX subscriber by telephone.

8. A system as claimed in claim 1, wherein the system is connected to several PABXs.

9. An information system for a PABX said PABX having PABX extensions, a control port, an operator switchboard for manual switching operations, and a direct inward dialling function for switching calls provided with a direct inward dialling code directly to the PABX extensions without assistance of the operator; the information system comprising,

- a database external to the PABX maintaining status information on subscribers for the PABX extensions
- a monitor external to the PABX associated with the operator switchboard for displaying the status information stored in the database,
- a voice message unit external to the PABX connected to at least one of the PABX extensions of said PABX for delivering and storing voice messages,
- the PABX for receiving a call from a calling party to a called PABX extension and for automatically switching the calling party to one of said predetermined PABX extension when there is no reply from the called PABX extension or when calls to the PABX extension are blocked,
- a control unit external to the PABX connected to said control port of the PABX, for receiving from the PABX an indication of the identity of the called station upon switching a call initially addressed to a called PABX extension, to said at least one predetermined PABX extension,
- said control unit being further connected to the database and to the voice message unit,
- said control unit being further connected to at least one office system providing additional information on the status of the PABX subscribers,
- said control unit being responsive to said information obtained from the PABX for retrieving status information of a subscriber of said called PABX extension from said database and providing control commands for the voice message unit on the basis of said retrieved status information and
- the voice message unit being responsive to said control command for generating voice messages to a calling party, said voice messages relating to the status of the subscriber of said called PABX extension and to the further handling of the call.

\* \* \* \* \*